Dec. 31, 1946.   C. V. FIRTH   2,413,492
METHOD OF PRODUCING IRON OXIDE AND
FOR PRODUCTION OF POWDERED IRON
Filed April 17, 1944
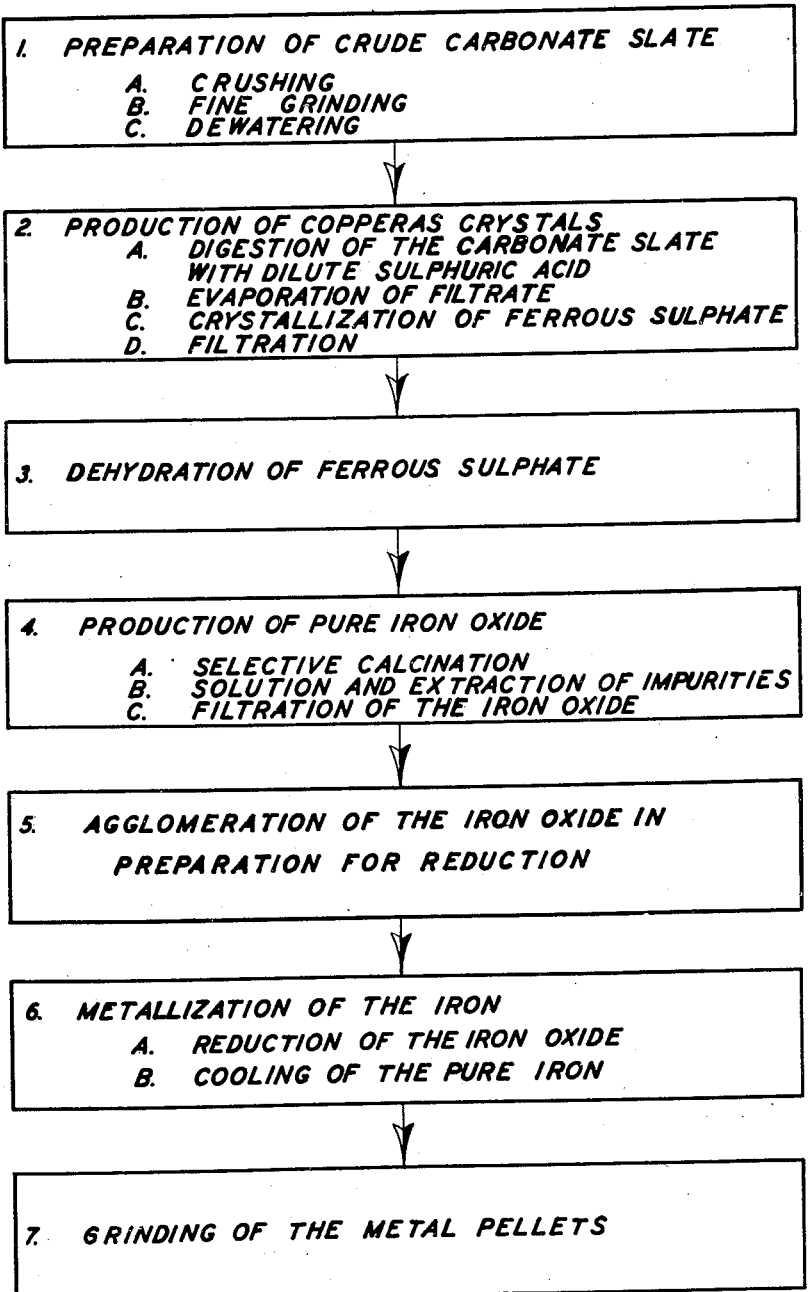

Patented Dec. 31, 1946

2,413,492

UNITED STATES PATENT OFFICE 2,413,492

METHOD OF PRODUCING IRON OXIDE AND FOR PRODUCTION OF POWDERED IRON

Charles V. Firth, Minneapolis, Minn., assignor to Continental Machines, Inc., a corporation of Minnesota Application April 17, 1944, Serial No. 531,324

5 Claims. (Cl. 23—200)

This invention relates to the art of powder metallurgy and has as its object the provision of a process of producing an iron powder of high purity on an economically practicable basis.

Broadly speaking, the invention resides in an integrated, complex process comprised of individual steps, each of which is more or less standard in chemical or mechanical technology, but which in combination result in an end product economically sound and superior in quality.

More than usual skill and technique are involved in the adaptation of correct and optimum conditions and procedure for each step because of the interdependent features which affect the cost, quality, and successful production of the end product.

High grade iron powders have been produced heretofore by such methods as the decomposition of iron penta-carbonyl, by electrolysis, and by the reduction of iron oxide mill scale. These previous sources of iron powder of sufficiently high purity, however, have limitations, such as the requirement for extremely high quality ore, the need for exceptionally low cost electrical power, limited quantity of raw material, or too high cost to the ultimate user.

In powder metallurgy, purity of better than 99% is practically a prerequisite for a high grade end product, and absence of abrasive impurities is imperative. In addition, the powder should be uniform in both chemical and physical properties for production of duplicate products. Such characteristics as hardness, porosity, readiness of cohesion between particles under pressure, density, particle size, shape, and flowing properties are all functions of the ultimate value of the finished metal product.

The iron powder obtained by the process of this invention not only meets the requirements of purity as well as chemical and physical properties, but offers a powder of low cost which is conceded essential to large volume consumption in competitive industry.

In the hope of locating a low cost source of raw material for the production of iron powder a general survey was made of the iron ores available in this nation, but none of the ores appeared to be of such character and structure that an iron powder of sufficient purity could be produced by mechanical concentration.

It has been found, however, that the highly siliceous ore found in the Mesabi range of the Minnesota iron ore deposits known as carbonate slate, and which occurs in very large quantities is amenable to processing by chemical means to an iron powder of very high purity. This ore, carbonate slate, is worthless for the regular production of iron.

The following description of the process by which this carbonate slate is converted into iron powder of the desired characteristics is best understood by following the accompanying diagrammatic flow sheet showing the individual steps involved in their proper sequence.

1. Preparation of crude carbonate slate

The immense tonnage of low grade iron ore, known as carbonate slate, found in the Mesabi range in Minnesota overlays a layer of taconite which constitutes a large share of the future ore reserves in this deposit. Hence, to reach the taconite the carbonate slate must be removed.

This slate is relatively low in lime, magnesia, and alumina, high in silica; and besides the carbonates, it contains silicates, some of which are complex and hydrated. Iron oxides present are mainly ferric oxide generally referred to as hematite.

Most of the silica in the crude ore is present as $SiO_2$ or quartz which is insoluble. The hydrated silicates are only slightly soluble in dilute sulphuric acid, but the carbonates are very soluble in dilute acid. Therefore the selection of this ore as a raw material represents an ideal and unique discovery: it combines low cost with desirable processing qualities. The following analysis represents the composition of a typical specimen of the carbonate slate ore:

| | Per cent |
|---|---|
| Fe | 26.00 |
| Mn | 0.70 |
| $SiO_2$ | 44.00 |
| MgO | 3.00 |
| CaO | 0.50 |
| $Al_2O_3$ | 1.50 |
| S | 0.16 |
| P | 0.05 |
| $CO_2$ | 12.00 |
| Loss on ignition | 4.00 |
| | 91.91 |

Balance—oxygen as oxides and undetermined.

After removal from the mine, this ore must be crushed and ground preferably to less than 48 mesh for proper digesting with dilute sulphuric acid. If the ore is not ground to this degree of fineness a longer time may be required for digestion of the ore. The grinding is accomplished with standard machines known as jaw crushers, cone crushers, and ball mills.

Screening and classifying machines are used to separate the fines from the coarse, the latter being returned to the proper stage for further size reduction. From the classifiers, where the ground ore is suspended in water, the ore is dewatered to at least 80% solids in standard equipment such as thickeners, filters, centrifuges etc. It is then ready for digestion.

2. Production of copperas crystals

Digestion of the ore is effected with dilute sulphuric acid and is carried out in two stages. Each stage requires about one and one-half (1½) hours and about half of the soluble iron is extracted in each. Lined wooden open top tanks with turbine blade agitators can be used for this purpose.

Mainly for economic reasons, low acid concentration, approximately 10% by volume, is used. While longer digestion periods are required with dilute acid, its use is advantageous because it results in almost complete consumption of free acid in the process. In the first stage, the ore is digested in the filtrate from the second stage.

The filtrate from the first stage is ready for the evaporators and the filter cake from this first stage is transferred to the second stage digestor. Here it is further digested with fresh warm acid made by adding concentrated sulphuric acid to the washings of the residue of the second stage. The filter cake from the second stage is waste.

The chemistry involved in the digestion process is represented simply by the following equation:

$$FeCO_3 + H_2SO_4 \rightarrow FeSO_4 + CO_2 + H_2O$$

The reaction is non-reversible and readily goes to completion. Some iron as ferrous silicate is dissolved as sulphate, but the silica is reprecipitated as tiny flakes which are removed as part of the filter cake. Aluminum, magnesium, and manganese likewise are dissolved as sulphates and are carried along in the filtrate. Because of the relative insolubility of its sulphate in strong sulphate solutions, most of the calcium in the ore remains in the filter cake. The very slight amount of ferric iron present in the ore presents no problem as that part thereof which does go into solution can be carried along with the ferrous sulphate.

Analyses show that approximately 70% of the total iron, 75% of the magnesium, 75% of the aluminum, and 90% of the manganese are extracted by 10% (by volume) sulphuric acid. Silica and any titanium present in the ore are not dissolved, and hence these objectionable impurities are eliminated easily in the process.

Since the solubility of ferrous sulphate is depressed by the presence of other sulphates, the filtrate going to the evaporators is adjusted to approximately 1.2 sp. gr. or approximately 13.7% $FeSO_4$, nicely allowing a sufficient factor of safety against loss by premature crystallization. A typical analysis of the strong liquor from the first stage digestor is as follows:

|  | Per cent |
|---|---|
| $FeSO_4$ | 13.7 |
| $MnSO_4$ | 0.8 |
| $MgSO_4$ | 1.7 |
| $CaSO_4$ | 0.1 |
| $Al_2(SO_4)_3$ | 1.1 |
| $H_2O$ | 82.6 |
|  | 100.0 |

Moore filter leaf equipment is best adapted to this process. Continuous drum filtration is not advisable because of the formation of slimes.

Evaporation of the filtrate from the first stage of digestion is carried out in a suitable evaporator preferably under a partial vacuum. The concentration of $FeSO_4$ is increased to approximately 30% and the solution leaves the evaporator at its maximum temperature of about 65° C.

The primary object of controlled evaporation and crystallization which follows is to obtain as much as possible of the dissolved iron as copperas crystals in which form it can be dissociated from the impurities to insure the desired high quality end product. This compound is the heptahydrate of ferrous sulphate and is represented by the formula $FeSO_4 \cdot 7H_2O$.

It is important that crystallization be commenced with a 30% ferrous sulphate solution with the solution at approximately 65° C. from which temperature it is cooled to promote crystallization. In addition it is important to terminate crystallization when approximately 70% of the ferrous sulphate has been crystallized out, at which time the temperature of the partially crystallized solution is approximately 20° C.

By controlling these factors to maintain substantially the values stated, maximum yields of copperas crystals without contamination by lower hydrates of ferrous sulphate are achieved. Lower hydrates of ferrous sulphate result from crystallization at elevated temperatures and these lower hydrates should be avoided as they are more likely than the heptahydrates to form double salts with manganous sulphate. These double salts are objectionable in that they do not lend themselves to successful selective thermal decomposition, the method here used to enable removal of the impurities.

The heptahydrates of ferrous and magnesium sulphates are isomorphic and therefore may form double or mixed crystals which behave as a single phase and consequently are even more difficult to handle during calcination (selective thermal decomposition) than the double salts of ferrous and manganous sulphates. To avoid as much as possible the difficulties which the formation of these double or mixed crystals entail in the subsequent selective thermal decomposition step, the crystallization preferably should not be carried much below the stated approximate minimum temperature. This follows from the known fact that the formation of the double or mixed crystals of ferrous and magnesium sulphates is accelerated at the lower crystallization temperatures.

Terminating crystallization when approximately 70% of the ferrous sulphate is crystallized out has the added advantage of eliminating most of the aluminum at this stage in the process. Because of the greater solubility of aluminum, the aluminum sulphate does not crystallize before termination of the crystallization at substantially the stated point. Hence, the aluminum remains in the mother liquor to pass off with the filtrate. Only that part thereof contained in the mother liquor adhering to the crystals is carried along to be later eliminated.

Crystallization of copperas on a large scale lends itself to a continuous vacuum process followed by rotating drum filtration.

Though proper control of the vital factors during crystallization precludes much of the possible formation of double or mixed crystals of ferrous and magnesium sulphates, some of these mixed crystals will be formed. They cannot be economically removed by recrystallization, but as will appear hereinafter, are eliminated by selective thermal decomposition.

Thus the crystallization of approximately 70% of the ferrous sulphate from the leach solution as $FeSO_4.7H_2O$ results in some mixed crystals containing $MgSO_4.7H_2O$ and adhering mother liquor containing dissolved magnesium, calcium, aluminum and manganese sulphates which cannot be washed out with water because the copperas ($FeSO_4.7H_2O$) redissolves in water. Some positive method is, therefore, required to remove these impurities.

Selective thermal decomposition of the copperas and oxidation of its contained iron at a temperature and in a manner to be described will leave all these impurities essentially as sulphates. These can then be washed out of the thermal decomposition product leaving insoluble $Fe_2O_3$.

3. Dehydration of ferrous sulphate

Because ferrous sulphate heptahydrate is deliquescent and melts in its water of crystallization and forms a hard cake when heated too rapidly, it is necessary to dehydrate it between 100° and 200° C. before beginning the thermal decomposition. This preliminary dehydration may be done in a multiple hearth furnace or simple drying kiln.

Besides preventing caking of the crystal mass during its thermal decomposition to oxide, preliminary dehydration results in stack gases from the calcination furnace stronger in sulphur and consequently facilitates sulphuric acid regeneration. This acid is used in the digestion of more ore.

The product of the dehydration step is a mechanical admixture of chemicals.

4. Production of pure iron oxide

The selective calcination (thermal decomposition) of the dehydrated ferrous sulphate is an exceedingly important step in this process because it makes possible the removal of magnesium, calcium, manganese, and aluminum impurities which are carried along essentially as sulphate crystals or adhering solution. The chemistry of the thermal decomposition of ferrous sulphate in the presence of air is briefly as follows: Beginning at 167° C. oxidation takes place and increases in rate with rise in temperature to 455° C. where the oxidation to basic sulphate is complete, and at the same time the last trace of water is expelled. The dissociation of the basic sulphate begins at 492° C. and is complete at about 560° C. These reactions are represented in equation forms as follows:

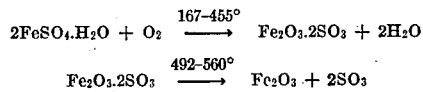

$$2FeSO_4.H_2O + O_2 \xrightarrow{167\text{-}455°} Fe_2O_3.2SO_3 + 2H_2O$$

$$Fe_2O_3.2SO_3 \xrightarrow{492\text{-}560°} Fe_2O_3 + 2SO_3$$

Aluminum sulphate begins to dissociate in a current of air at 590° C. and decomposes rapidly at 639° C. Manganous sulphate decomposes at 699° C. to 790° C. magnesium and calcium sulphates at still higher temperatures. The close proximity of the dissociation temperature of anhydrous aluminum sulphate to that of basic ferrous sulphate indicates questionable selective decomposition. Fortunately, the aluminum sulphate is completely soluble in the mother liquor and remains in solution throughout the crystallization of the ferrous sulphate so that practically all of it is eliminated as part of the filtrate after the crystallization step. The ferric oxide has a purity of 99.8% after removing soluble undecomposed sulphates with hot water.

A multiple hearth furnace can be used for the selective thermal decomposition of ferrous sulphate and basic ferrous sulphate. Conditions in such a furnace are such that the gaseous products, namely first water and then sulphur trioxide are drawn off continuously, practically eliminating their partial pressures above the bed of crystals undergoing calcination and thereby accelerating the reaction to completion.

A continuous flow of air through the furnace serves a multiple purpose of supplying oxygen for oxidation of the ferrous iron, sweeping away gaseous products and depressing the dissociation of sulphur trioxide. A temperature of 700° C. (measured directly above the bed of crystals) was found to be the optimum temperature for purity of product and speed of production.

While this temperature (700° C.) is higher than the dissociation temperature of pure ferrous sulphate and even higher than that of aluminum sulphate, the conditions under which the selective calcination are carried out and which result in the partial pressures of sulphur gases and absorption of heat of decomposition in the bed of crystals, plus the indirect effect which the different kinds of crystals have upon each other as to their dissociation temperatures explains the selection of this optimum temperature.

A lower temperature results in incomplete reaction within a reasonable length of time and a difficult product to filter after leaching out soluble sulphates. A higher temperature results in decomposition of aluminum sulphate and therefore contamination by aluminum oxide. Approximately two hours are required in a multiple hearth furnace to complete the reaction at 700° C.

Though the double or mixed crystals of ferrous and magnesium sulphates quite obviously have a definite decomposition temperature at a given pressure, this point has not been determined. However, the absence of magnesium in the final product indicates that the decomposition of these double or mixed crystals (which behave as a single phase) occurs at a temperature above that at which the decomposition of aluminum sulphate takes place. Hence, in carrying out the calcination in the manner stated decomposition of the double or mixed crystals of ferrous and magnesium sulphates is avoided.

Purity of the product after selective thermal decomposition is dependent on the completeness with which aluminum, manganese, magnesium and calcium sulphates are washed out of the insoluble iron oxide. A 10% barium chloride solution provides a very sensitive test for sulphates in the washings.

The removal of the sulphates is preferably effected by quenching the hot decomposition product in water followed by washing which may be done in a continuous operation by passing iron oxide pulp at 25% solids through an agitator, the material being charged at the bottom and overflowing the top. Agitation is desirable to insure complete mixing and wetting of each particle of $Fe_2O_3$. The overflow from the washer is filtered on any suitable filter on which efficient washing may be accomplished and the filter cake is discharged at about 60% solids.

5. Preparation of the iron oxide for reduction

Since the oxide from the calcination furnace is below 325 mesh and since a size distribution between 100 mesh and 325 mesh is wanted in iron powder, it is necessary to agglomerate all of the oxide.

Excessively fine subdivision of the iron oxide is to be avoided as in this condition it sinters or fuses during the reduction step which follows.

Agglomeration is accomplished by extrusion through ¾" to 1" orifices. The moisture content may have to be adjusted to insure good results. The briquets are then fired to about 1025° C. in an oxidizing atmosphere, the product being a hard porous pellet. Agglomeration in this manner serves two purposes: (1) it completely removes any sulphur which may remain in the oxide due to incomplete washing, and (2) it puts the oxide in a physical form very suitable for metallization of the iron.

6. *Metallization of the iron*

The briquets of oxide are chemically reduced to sponge iron in a shaft-type furnace with a mixture of hydrogen and carbon monoxide or blue water gas. The reduction is complete, the balls or briquets retaining their original shape and possessing sufficient strength to support the weight of a high column of metallized briquets and oxide. The metallized product must be cooled in a non-oxidizing atmosphere, after which it is very stable.

Equal volumes of oxygen-free hydrogen and carbon monoxide (blue water gas) provides a desirable reducing agent. The presence of any oxygen causes oxidation during cooling indicated by a spotted or dark appearance of the product. Carbon monoxide alone cannot be used because it produces an excessive deposition of carbon in the product.

Chemically the reduction is represented by the equation:

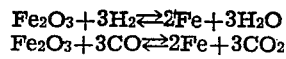

$$Fe_2O_3 + 3H_2 \rightleftarrows 2Fe + 3H_2O$$
$$Fe_2O_3 + 3CO \rightleftarrows 2Fe + 3CO_2$$

7. *Grinding of the metal pellets*

The balls or pellets of pure sponge iron may be pulverized in any suitable comminuting equipment such as a hammer mill, a rod mill, ball mill, or disc pulverizer. The grinding may be done in a closed circuit with a screen of suitable mesh, by air separation or a combination of the two. No oxidation of the iron occurs during grinding in an atmosphere of air.

After grinding the sponge iron pellets to pass a 100 mesh screen, the particle size distribution becomes nearly ideal for compression of the iron powder into briquets as each particle or grain of the powder thus produced is composed of a plurality of minute particles of a size substantially that of the ferric oxide particles (the product of calcination). The method of grinding and the fineness of grind are functions of the iron powder density, which is an important factor of its value in compression technique. High density is desirable for dimensional stability of the ultimate product.

From the foregoing description, it will be readily apparent to those skilled in this art that this invention embodies several novel features.

First, the selection and adaptation of a very low cost ore ideally constituted chemically to acid extraction with dilute sulphuric acid, which avoids an objectionable impurity of all ores, namely, silica and also titanium, if present.

Second, controlled partial crystallization of the extracted ferrous iron as $FeSO_4.7H_2O$, a sulphate best suited for selective thermal decomposition.

Third, selective thermal decomposition to water insoluble ferric oxide from which the impurities as undecomposed soluble sulphates can be extracted.

Fourth, reduction of pure oxide to pure iron in an atmosphere of hydrogen and carbon monoxide (blue water gas).

Fifth, recovery of sulphur trioxide and dioxide resulting from the thermal decomposition of ferrous sulphates to regenerate sulphuric acid and decrease new acid requirement for digestion of ore.

It will also be readily apparent to those skilled in the art that deviations may be made from the foregoing disclosure without leaving the scope of this invention expressed in the appended claims.

What I claim as my invention is:

1. In the hereindescribed process of producing iron powder of exceedingly high purity suitable for powder metallurgy from a low grade iron ore wherein the iron appears chiefly as iron carbonate and which contains objectionable quantities of manganese, magnesium, calcium and aluminum, the steps of: digesting the ore with sulphuric acid so as to produce water soluble sulphates of iron, and the said non-ferrous metals present in the ore; evaporating the sulphate solution under such conditions that evaporation is terminated with the solution at approximately 65° C. and approximately 30% iron sulphate concentration; crystallizing ferrous sulphate heptahydrate from the solution while cooling said solution from said approximate temperature of 65° C., but terminating the crystallization before more than approximately 70% of the ferrous sulphate has crystallized; removing the formed crystals and such sulphates as adhere thereto, from the mother liquor; calcining the removed crystals in an oxidizing atmosphere and at a temperature insufficient to decompose the sulphates of said non-ferrous metals, but sufficient to decompose the iron sulphate; and washing the sulphates of the said non-ferrous metals out of the ferric oxide resulting from calcination in an oxidizing atmosphere.

2. In the hereindescribed process of producing iron of exceedingly high purity from a low grade iron ore wherein the iron appears chiefly as iron carbonate and which contains objectionable quantities of nonferrous metals, the steps of: digesting the ore with sulphuric acid so as to produce water soluble sulphates of iron and of the nonferrous metals present in the ore; crystallizing ferrous sulphate heptahydrate from the solution, but terminating the crystallization before more than approximately 70% of the ferrous sulphate has crystallized; removing the formed crystals and such sulphates as adhere thereto, from the mother liquor; calcining the removed crystals in an oxidizing atmosphere and at a temperature insufficient to decompose the sulphates of the nonferrous metals but sufficient to decompose the iron sulphate; and washing the sulphates of the nonferrous metals out of the ferric oxide resulting from calcination in an oxidizing atmosphere.

3. In the hereindescribed process of producing iron of exceedingly high purity from a low grade iron ore wherein the iron appears chiefly as iron carbonate and which contains objectionable quantities of manganese, magnesium, calcium, and aluminum, the steps of: digesting the ore with sulphuric acid so as to produce water soluble sulphates of iron and of the said nonferrous metals present in the ore; adjusting the concentration of the solution to approximately 30% iron sulphate and the temperature thereof to approximately 65° C.; crystallizing ferrous sulphate heptahydrate from the solution until just before crystallization of the aluminum sulphate begins and before appreciable quantities of double or mixed crystals of iron and magnesium sulphate are formed; removing the formed crystals and such sulphates as adhere hereto, from the mother liquor; calcining the removed crystals in an oxidizing atmosphere and at a temperature insufficient to decompose the sulphates of the said nonferrous metals but sufficient to decompose the iron sulphate; and washing the sulphates of the said nonferrous metals out of the ferric oxide resulting from calcination in an oxidizing atmosphere.

4. In the hereindescribed process of producing iron of exceedingly high purity from a low grade iron ore wherein the iron appears chiefly as iron carbonate and which contains large quantities of silica and objectionable quantities of nonferrous metals, the steps of: digesting the ore with sulphuric acid to produce water soluble sulphates of iron and the nonferrous metals present in the ore and to leave undissolved the silica content of the ore; extracting the silica and any other insoluble constituents of the ore from the solution; crystallizing ferrous sulphate heptahydrate from the solution, but terminating the crystallization before more than approximately 70% of the ferrous sulphate has been crystallized; removing the formed crystals and such sulphates as adhere thereto, from the mother liquor; calcining the removed crystals in an oxidizing atmosphere at a temperature of approximately 700° C. to decompose the iron sulphate but not the sulphates of the nonferrous metals; and washing the sulphates of the nonferrous metals out of the ferric oxide resulting from the calcination in an oxidizing atmosphere.

5. In the hereindescribed process of producing iron powder of exceedingly high purity suitable for powder metallurgy from a low grade iron ore wherein the iron appears chiefly as iron carbonate and which contains large quantities of silica and objectionable quantities of nonferrous metals, the steps of: digesting the ore with sulphuric acid so as to produce water soluble sulphates of iron and the nonferrous metals present in the ore and also leave undissolved the silica and other constituents of the ore which are insoluble in sulphuric acid; extracting the silica and such other insoluble constituents from the sulphate solution; adjusting the concentration of the sulphate solution to approximately 30% iron sulphate and the temperature thereof to approximately 65° C.; crystallizing ferrous sulphate heptahydrate from the solution, but terminating the crystallization before more than approximately 70% of the ferrous sulphate has been crystallized, to thereby substantially avoid the crystallization of the sulphates of any of the nonferrous metals present as contaminants; removing the formed crystals and such sulphates as adhere thereto, from the mother liquor; calcining the removed crystals in an oxidizing atmosphere and at a temperature of approximately 700° C. to decompose the iron sulphate but not the sulphates of the nonferrous metals; and washing the sulphates of the nonferrous metals out of the ferric oxide resulting from calcination in an oxidizing atmosphere.

CHARLES V. FIRTH.